No. 640,903. Patented Jan. 9, 1900.
J. W. HARLAND.
BOOK AND SYSTEM FOR BOOKKEEPING.
(Application filed Mar. 30, 1899.)

(No Model.) 3 Sheets—Sheet 1.

Witnesses:
Frank S. Blanchard
Howard L. Kraft

Inventor:
Judge W. Harland
By Attorney
Francis W. Parker

No. 640,903. Patented Jan. 9, 1900.
J. W. HARLAND.
BOOK AND SYSTEM FOR BOOKKEEPING.
(Application filed Mar. 30, 1899.)
(No Model.) 3 Sheets—Sheet 2.

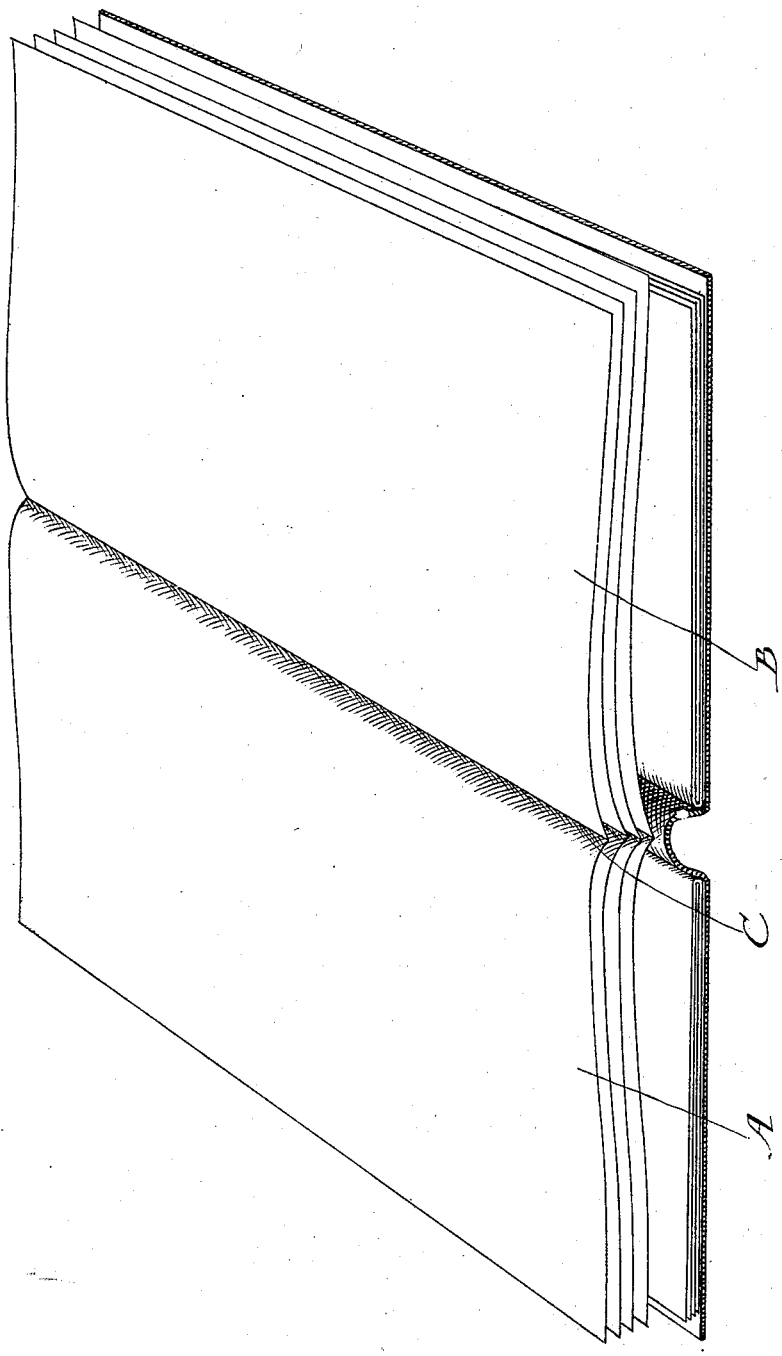

UNITED STATES PATENT OFFICE.

JUDGE W. HARLAND, OF LINCOLN, NEBRASKA.

BOOK AND SYSTEM FOR BOOKKEEPING.

SPECIFICATION forming part of Letters Patent No. 640,903, dated January 9, 1900.

Application filed March 30, 1899. Serial No. 711,043. (No model.)

*To all whom it may concern:*

Be it known that I, JUDGE W. HARLAND, a citizen of the United States, residing at Lincoln, in the county of Lancaster and State of Nebraska, have invented a certain new and useful Improvement in Books and Systems for Bookkeeping, of which the following is a specification.

My invention relates to systems for bookkeeping and the like, and has for its object to provide a new and improved system and forms for this purpose.

My invention is illustrated in the accompanying drawings, wherein—

Figures 1 and $1^a$ are views showing a form for accounts payable embodying my invention, the form shown in these two figures presenting a continuous page or sheet when used in practice. Fig. 2 is a view of a book embodying my invention.

Like letters refer to like parts throughout the several figures.

In carrying out my invention I prefer to arrange the form shown in the drawings so that it will practically form one continuous page. This is done by arranging the form so that when bound into a book, as is ordinarily done, it will form two opposed pages A and B, the form folding at the middle or part C when the book is closed. This permits the form to be spread out before the eye when the book is open, so that all the entries thereon may be seen at a glance. In order not to reduce the drawings too much, I have shown what in practice is a continuous sheet as divided into two parts, one being shown in Fig. 1 and the other in Fig. $1^a$.

I have illustrated in the drawings a complete form for ordinary use; but it is of course evident that parts of this form may be omitted and parts changed and other parts used with modifications not herein shown without in any manner departing from the spirit of my invention, and I have selected this particular form for purposes of illustration and explanation.

Referring now to Fig. 1, the form as shown is provided with a series of lines running in a horizontal direction across the page and is also provided with a series of columns substantially at right angles to these lines. The columns are provided with suitable headings, which indicate the meaning of the characters found therein. Commencing now at the left of the form, I will describe in detail its arrangement and use. In the first column on the left, which I will call A', I place the invoice numbers. These numbers represent the invoice number of the party buying the goods. In the second column $A^2$, I put the invoice number of the party selling the goods, and in the third column $A^3$ is placed the name of the party from whom the goods are purchased. It is the custom when goods are purchased to pay for them in a given time— say, for example, thirty, sixty, or ninety days. In column $A^4$ is placed the date of the invoice or purchase. In column $A^5$ is placed the number of days the bill runs— that is, the number of days from the purchase to the time when the bill is to be paid. In column $A^6$ is placed the maturity of the payment—that is, the month and day at which the payment must be made. It is customary for the seller to give a discount for cash or for payment in thirty, sixty, or ninety days, and I have arranged column $A^7$ so as to form a discount-column, the amount of the discount for cash—ten, thirty, sixty, or ninety days— being put under the respective heading, so that the buyer can tell at a glance the amount the bill will be reduced by paying it within any of these dates. In column $A^8$ is placed the amount of the invoice—that is, the amount that must be paid for the bill of goods. In column $A^9$ is placed the date at which the payment is made when such payment is made before maturity in order to obtain the discount, and the nature of the payment, whether by check, cash, note, or the like, is shown by column $A^{10}$. If the payment is made by check, that fact will be indicated by, say, the number of the check. If made by note or cash, a corresponding entry will be made, the amount being placed in column $A^{11}$. If any discount is taken, the amount set down in column $A^{11}$ will be less than the amount in column $A^8$ by this discount, and the discount is put down in column $A^{12}$. The total payment is then put down in column $A^{13}$. The next column, D, (shown in Fig. $1^a$,) contains the days of the month. On account of lack of space I have shortened up these columns in the drawings; but it will be understood that these columns will be long enough to contain the figures from "1" to "31," inclusive. At the right of the column D is a series of columns D′ D², &c., for each month of the year, said columns being subdivided, so as to form the column E with the heading "Line" and the column E′ with the heading "Amount." In these columns is placed the amount of the payment to be made, the amount being placed in the column representing the month during which it is to be paid and being located opposite the figure in the column D which represents the day of the month on which the payment is to be made. Under the heading "Line" in the subdivision E would be placed the number of the line on which the entry relating to the goods is made. By this arrangement the payments to be made in any given month will be seen at a glance, for all that is necessary is to glance down the column representing that month. The day of the month on which the payment is to be made will also be noted, and the relative times at which numerous payments must be made will also be shown by inspecting these columns. The manner in which the entries are made in the various columns will be readily seen. Suppose, for example, the first bill of goods was bought January 3, 1897, from John Doe & Co., to be paid for in thirty days, with a discount of two per cent. if paid for in ten days. In making the entry of this purchase the name of the company would be placed in column $A^3$ on line 1, the date of the purchase in column $A^4$, the number of days before payment was due in column $A^5$, which in this case was thirty days, and the day of the month at which the payment matures in column $A^6$. In column $A^7$ under the heading "10" would be placed "2," indicating two per cent. discount in ten days. In column $A^8$ would be placed the amount of the purchase, which in this case we will suppose is fifty dollars. This being a thirty-day payment, the payment will come due, say, on the 2d day of February, and hence the amount of the payment would be set down in the column representing the month of February—that is, column $D^2$—the entry being made opposite the figure "2" in column D, as shown. Under the subheading "Line" would be placed the figure "1," denoting that the entry was made on line "1." If now the purchaser decides to take two per cent. discount, he pays the bill by the expiration of said days—say on January 13—and this date is set down in column $A^9$. The dates in said column $A^9$ represent the dates on which the bills are paid. If payment is made by check, this fact and the number of the check is placed in column $A^{10}$. The amount being fifty dollars and the discount being two per cent., the amount to be paid will be forty-nine dollars, and this will be placed in column $A^{11}$, the discount of one dollar being placed in column $A^{12}$ and the total amount—fifty dollars—being placed in column $A^{13}$. The other invoices and the data are put down in a similar manner, so that everything will show upon a single sheet.

I prefer to add to the sheet the columns F, F′, F², and F³, representing four months of the next year—that is, four months beyond the twelve months represented by the columns D′ D², &c., so that when goods are bought at the last of the year the time at which the payment is to be made will show upon the same sheet with the entry of the invoice. I also prefer to add one or more additional day-of-the-month columns G, so as to facilitate the entry and reading of the various data.

It will thus be seen that I have here a system and form by which the data usually located in various books is assembled upon a single sheet, the form being such that the condition of the business can be easily read at a glance by persons having practically no knowledge of bookkeeping.

The invoice number of the party using my invention and which is set out in column A′ may be attached to the goods he is handling, as may also be the invoice of the party from whom he buys, which latter invoice is shown by the column $A^2$. When this is done, the party using my invention can instantly locate any invoice to ascertain when and where the article was purchased.

When the form herein shown is used, I have on one sheet the date of all purchases, the time each bill runs before due, the date of maturity of each bill, the relative times at which the several bills are due, and the different rates of discount allowed upon each bill, all such facts being ascertained at a glance. It will thus be seen that my system and form greatly simplify the practice of bookkeeping and put the business in such shape that the condition of affairs may be ascertained by any one without the assistance of expert accountants and bookkeepers. By taking the total amount of the entries in the purchase-column and subtracting therefrom the total payments made I can in a short time ascertain the liabilities at any given date. The fact as to whether a payment has been made by personal check, bank exchange, note, &c., shows on the sheet, and hence it is not necessary to make an impression copy of the remittance. All of the amounts payable in any given month are instantly ascertained by examining the column representing that month, and hence the undesirable grouping of payments may be avoided, for upon buying a bill of goods to be paid for in thirty or sixty days it can be readily ascertained whether the payment comes too close to the payment on a prior order, and arrangement may be made accordingly. This form also shows the time from the payment of one account to the payment of the next in the order in which such accounts are due, and hence the exact condition of the payments will be always known and proper arrangements can be made to meet them.

I have not attempted to describe in detail all the advantages to be derived from this system, as such advantages will readily occur to those versed in the art.

I may place at the bottom of the sheet a series of columns containing data referring to the invoices above. For example, I may provide a column H for the name of the party from whom the goods are purchased, with suitable date-columns, a debit and credit column, and a remark-column H'. If, for example, some of the goods were returned, the entry can be made in columns H and H', the remarks showing what the goods were and the amount returned. It is of course evident that any other data referring to the purchase may be inserted in these columns—such, for example, as goods damaged, overcharges, &c. This data being on the same page will not be overlooked in any transactions involving the purchases to which it relates. I may also provide a series of columns I, provided with suitable headings—such as "Dry goods," "Groceries," "Carpets," and the like—showing a classification of purchased articles, the amount purchased at any given time of any given article being entered in the proper column. This gives me at a glance the total purchases of each article dealt in. At the right of the classification of purchases I have shown a series of columns J, containing the days of the month consecutively. These columns instead of being in one continuous column are made in several columns, as shown, to economize space. I also provide sales-columns, divided into a cash-column K and a credit-column K', in which are entered, respectively, the cash sales and credit sales for each day. I may also provide a column for collections on account, divided into a cash-column $K^2$, a goods-returned column $K^3$, and a notes-column $K^4$, in which any entries relating to these matters may be noted. By having the total purchases and sales and other data relating thereto associated in this manner I can produce a statement in a very short time in case of a total loss of the stock by fire that will show, substantially, the loss sustained, so that the loss may be known to the insurance companies without any delay and with comparative certainty.

The forms after being made up are bound into a book and so arranged as to fold at the middle part C, the opposed faces of any two adjoining leaves coöperating to form a continuous face or surface when the book is open to receive the data relating to the accounts.

I claim—

1. A book for keeping accounts, comprising a series of sheets, each provided with a series of numbered lines upon which the names of the parties with whom accounts are kept may be placed in a suitable column, a column containing figures representing the days of the month, a series of parallel columns with headings which indicate the months of the year, said columns subdivided so as to receive the amount due and the number of the line upon which the name of the party with whom the account is kept is found, the sheets folded near their middle and bound into a book in such relation to each other that two opposed faces of two adjoining sheets form a continuous page when the book is open to receive the matter relating to the accounts.

2. A form for accounts, comprising a series of numbered lines upon which the names of the creditors may be placed in a suitable column, a column containing figures representing the days of the month, a series of parallel columns with headings which indicate the months of the year, said columns subdivided so as to receive the amount due and the number of the line upon which the creditor's name is found.

3. A form for accounts, comprising a series of lines running across the sheet, a series of columns running at right angles to said lines and provided with suitable headings, said columns arranged to receive the numbers of the lines, the names of the creditors, the dates when the payments are due and the amounts of the payments, a column containing figures representing the days of the month, a series of columns with headings which indicate the months of the year, each of said latter columns subdivided so as to form a column in which the amount due may be placed and a column in which the number of the line upon which the account is entered may be placed.

4. A form for accounts, comprising a sheet having a series of numbered lines running thereacross, a series of columns provided with suitable headings and adapted to receive the names of the creditors, the dates when the debts were made, the dates when the debts are due and the amounts of the debts, a second series of columns with headings which indicate the months of the year, each subdivided into a column adapted to receive the amount due and a column adapted to receive the number of the line upon which the account is entered, and a series of figures running parallel to said latter columns and representing the days of the month, all of said columns arranged upon a single sheet.

5. A form for accounts, comprising a sheet having a series of numbered lines running thereacross, a series of columns provided with suitable headings and adapted to receive the names of the creditors, the dates when the debts were made, the dates when the debts are due and the amounts of the debts, a second series of columns with headings which indicate the months of the year, each subdivided into a column adapted to receive the amount due and a column adapted to receive the number of the line upon which the account is entered, a series of figures running parallel to said latter columns and representing the days of the month, all of said columns arranged upon a single sheet, and a third series of columns contained on the same sheet and representing the months of a portion of the next year, so that the entries relating to a given transaction may be placed upon the same sheet therewith.

6. A form for accounts, comprising a sheet having a series of numbered lines running thereacross, a series of columns at right angles to said lines and provided with suitable headings, said columns adapted to receive respectively the name of the creditor, the date at which the debt begins to run, the date at which the debt must be paid, the discount given upon payment before maturity, the amount of the debt, the date the debt is paid and the manner of paying the same, a second series of columns with headings which indicate the months of the year, each of said latter columns subdivided into columns adapted to receive the amount to be paid and the number of the line upon which the account is entered, a series of figures associated with these latter columns representing the days of the month, all of said columns located upon a single sheet, substantially as described.

7. A form for accounts, comprising a sheet having a series of numbered lines running thereacross, a series of columns substantially at right angles to said lines and running only part of the length of the sheet, said columns provided with suitable headings and adapted to receive respectively the name of the creditor, the date at which the debt begins to run, the date at which the debt is due and the amount of the debt, a series of columns with headings which indicate the months of the year, each of which is subdivided into a column for receiving the amount due and a column for receiving the number of the line upon which the entry is originally made, a series of numbers representing the days of the month, said numbers associated with the columns representing the months of the year, and a separate set of columns at the bottom of the sheet adapted to receive data relating to the entries above.

8. A form for accounts, comprising a sheet having a series of numbered lines running thereacross, a series of columns substantially at right angles to said lines and running only part of the length of the sheet, said columns provided with suitable headings and adapted to receive respectively the name of the creditor, the date at which the debt begins to run, the date at which the debt is due and the amount of the debt, a series of columns with headings which indicate the months of the year, each of which is subdivided into a column for receiving the amount due and a column for receiving the number of the line upon which the entry is originally made, a series of numbers representing the days of the month, said numbers associated with the columns representing the months of the year, and a second series of columns at the bottom of the sheet provided with suitable headings representing the classification of the purchases entered on said numbered lines.

9. A form for accounts, comprising a sheet having a series of numbered lines running thereacross, a series of columns substantially at right angles to said lines and running only part of the length of the sheet, said columns provided with suitable headings and adapted to receive respectively the name of the creditor, the date at which the debt begins to run, the date at which the debt is due and the amount of the debt, a series of columns with headings which indicate the months of the year, each of which is subdivided into a column for receiving the amount due and a column for receiving the number of the line upon which the entry is originally made, a series of numbers representing the days of the month, said numbers associated with the columns representing the months of the year, a second series of columns at the bottom of the sheet provided with suitable headings representing the classification of the purchases entered on said numbered lines, and a series of columns in which are placed the cash and credit sales made during each day.

JUDGE W. HARLAND.

Witnesses:
J. D. POPE,
S. J. COONRADT.